United States Patent
Bonvin et al.

(10) Patent No.: US 7,300,611 B2
(45) Date of Patent: Nov. 27, 2007

(54) CAPACITANCE CONTROLLING PROCESS

(75) Inventors: Pierre-Yves Bonvin, Romanel-s-Lausanne (CH); Giancarlo Evangelisti, Yverdon-les-Bains (CH); Philippe Gerhard, Penthaz (CH)

(73) Assignee: Maillefer SA, Ecublens (CH)

( * ) Notice: Subject to any disclaimer, the term of this patent is extended or adjusted under 35 U.S.C. 154(b) by 526 days.

(21) Appl. No.: 10/478,535

(22) PCT Filed: Jun. 6, 2002

(86) PCT No.: PCT/CH02/00298

§ 371 (c)(1),
(2), (4) Date: Nov. 24, 2003

(87) PCT Pub. No.: WO02/103717

PCT Pub. Date: Dec. 27, 2002

(65) Prior Publication Data

US 2004/0145857 A1    Jul. 29, 2004

(30) Foreign Application Priority Data

Jun. 19, 2001   (EP) .................... 01810597

(51) Int. Cl.
*B29C 44/20* (2006.01)
*B29C 44/24* (2006.01)

(52) U.S. Cl. ............... 264/45.9; 264/40.3; 264/46.9; 264/101; 264/102

(58) Field of Classification Search ........... 264/40.3, 264/45.9, 101, 102, 46.9
See application file for complete search history.

(56) References Cited

U.S. PATENT DOCUMENTS

| 3,681,510 | A | * | 8/1972 | Lemieux | ................... 174/23 R |
| 3,972,970 | A | * | 8/1976 | Taylor | ........................ 264/45.9 |
| 4,278,624 | A | * | 7/1981 | Kornylak | .................. 264/37.16 |
| 4,585,603 | A | | 4/1986 | Furuta et al. | |
| 5,900,198 | A | * | 5/1999 | Hori | ............................ 264/50 |
| 6,613,983 | B1 | * | 9/2003 | Shukushima et al. | ..... 174/110 F |

FOREIGN PATENT DOCUMENTS

| GB | 2 130 763 A | 6/1984 |
| JP | A 5-20944 | 1/1993 |

* cited by examiner

*Primary Examiner*—Allan R. Kuhns
(74) *Attorney, Agent, or Firm*—Oliff & Berridge, PLC

(57) ABSTRACT

Process for controlling the capacitance value (C1) of a tubular sheath (1) formed by extrusion of an insulation compound (2) on an electrical cable (3) in an extrusion head (4),
a foaming agent (FA) being introduced in the insulation compound (2) in such a way as to improve the capacitance value (C1) of the tubular insulation sheath (1),
this process being characterised in that:
a predetermined amount of foaming agent (200) is used in such a way as to obtain a predetermined capacitance value (C1) for the tubular insulation sheath (1), and
in order to control precisely the capacitance value (C1) of the tubular insulation sheath (1), a gas pressure (110) is applied on at least a portion of a face (100, 101) of the insulation compound (2) extruded by the extrusion head is (4),
the value of the gas pressure (110) is changed in such a way as to control the capacitance value (C1) of the tubular insulation sheath (1).

7 Claims, 2 Drawing Sheets

CAPACITANCE CONTROLLING PROCESS

This invention relates to a process for controlling the capacitance value of an electrical sheath provided on an electrical cable, by extruding and depositing an electrically insulating compound onto the said electrical cable.

This invention also relates to:
an extrusion line which functions according to the above-mentioned process,
an electrical cable comprising a tubular sheath formed by extrusion of an insulation compound on this electrical cable and which capacitance value is controlled according to the above-mentioned process.

The invention concerns more specifically, but not exclusively, a method for controlling the capacitance value of a sheath of foamed insulation compound extruded on a metallic wire.

The invention preferably, but not exclusively, applies to a capacitance control method for a sheath of foamed material, which is extruded onto a metallic wire.

A main object of the invention is to control precisely the capacitance value of an electrical sheath provided on an electrical cable.

To achieve this object, the invention has as it subject matter a process for controlling the capacitance value of a tubular sheath formed by extrusion of an insulation compound on a electrical cable in an extrusion head, a foaming agent being introduced in the insulation compound in such a way as to improve the capacitance value of the tubular insulation sheath, this process being characterised in that:
a predetermined amount of foaming agent is used in such a way as to obtain a predetermined capacitance value for the tubular insulation sheath, and
in order to control precisely the capacitance value of the tubular insulation sheath, a gas pressure is applied on at least a portion of a face of the insulation compound extruded by the extrusion head,
the value of the gas pressure is changed in such a way as to control the capacitance value of the tubular insulation sheath.

The invention also relates to an extrusion line which functions according to the above-mentioned process.

The invention also relates to an electrical cable comprising a tubular sheath formed by extrusion of an insulation compound on this electrical cable and which capacitance value is controlled according to the above-mentioned process.

BRIEF DESCRIPTION OF THE DRAWINGS

The invention will be better understood from reading the following description, given by way of non-limiting example, with reference to the attached figures:

Referring to FIG. 1, one sees an extrusion line which is used in order to form a sheath 1 of insulation compound 2 on an electrical cable 3.

Figure 1:
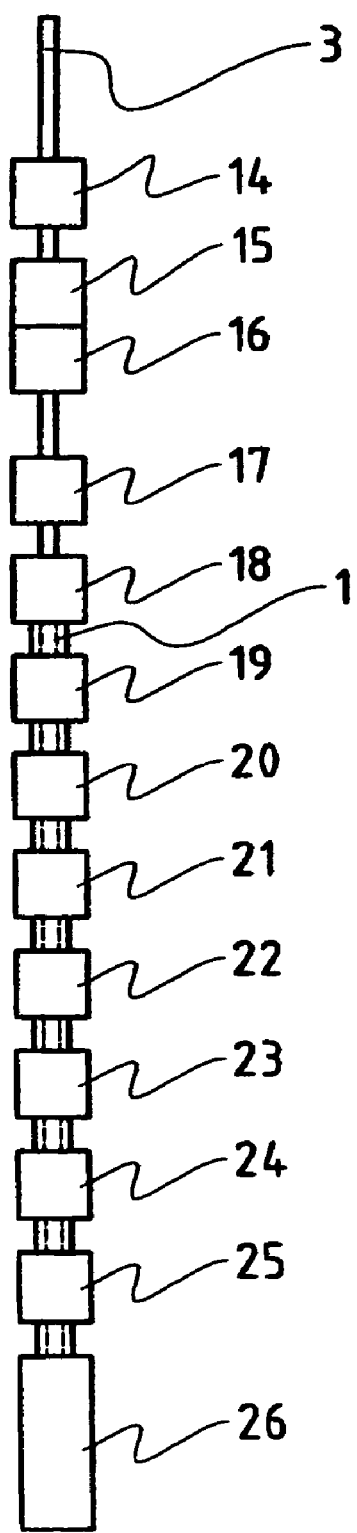
FIG. 1 shows an extrusion line, which is able to function according to the process of the invention.

This extrusion line at least comprises a main extruder 18, including an extrusion head 4, the function of this extrusion head being to put foam insulation at least around the cable 3.

Preferably, but not exclusively, such an extrusion line comprises:
a wire-drawing machine 14, the function of which is to reduce the cable 3 diameter (cable copper diameter) between the inlet and the outlet of the machine,
an annealer machine 15, the function of which is to soften the cable 3,
a preheater machine 16, the function of which is to heat the cable 3 in order to improve the adherence of the insulation compound 2,
the said main extruder 18, comprising the said extrusion head 4,
a mobile water trough 20 which is used to stop foam expansion,
a hot water tank 21 which is a water tank for the mobile trough,
a capstan 22, which is a line capstan and capacitance measure,
a diameter device 23, which is a diameter measure,
an eccentricity device 24, which is an eccentricity measure,
a spark-tester device 25, which is an insulation faults measure,
a take-up 26, where the cooled insulated conductor is finally coiled on a reel.

In this extrusion line a so-called pay-off apparatus could be used instead of the two machines which are the wire-drawing machine 14 and the annealer machine 15. In such an extrusion line a cold fix tough could be placed between the hot water tank 21 and the capstan 22.

Figure 2:
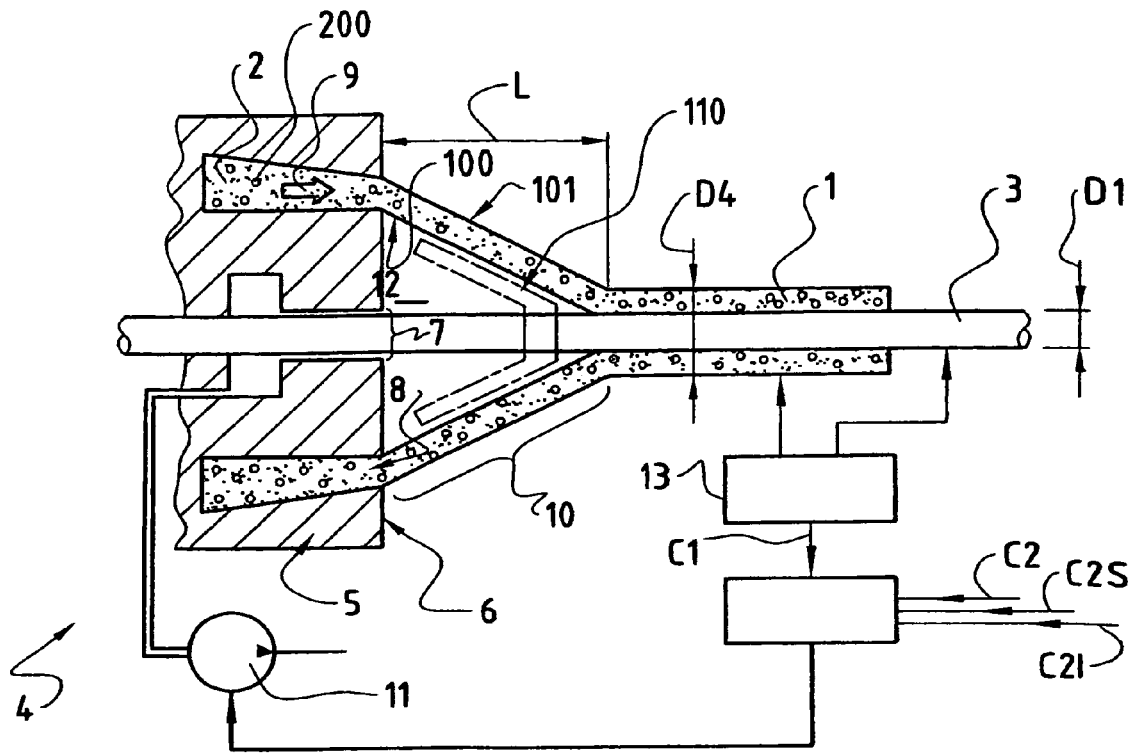
FIG. 2 is a partial longitudinal section of an extrusion head in the extrusion line of FIG. 1.
Figure 3:
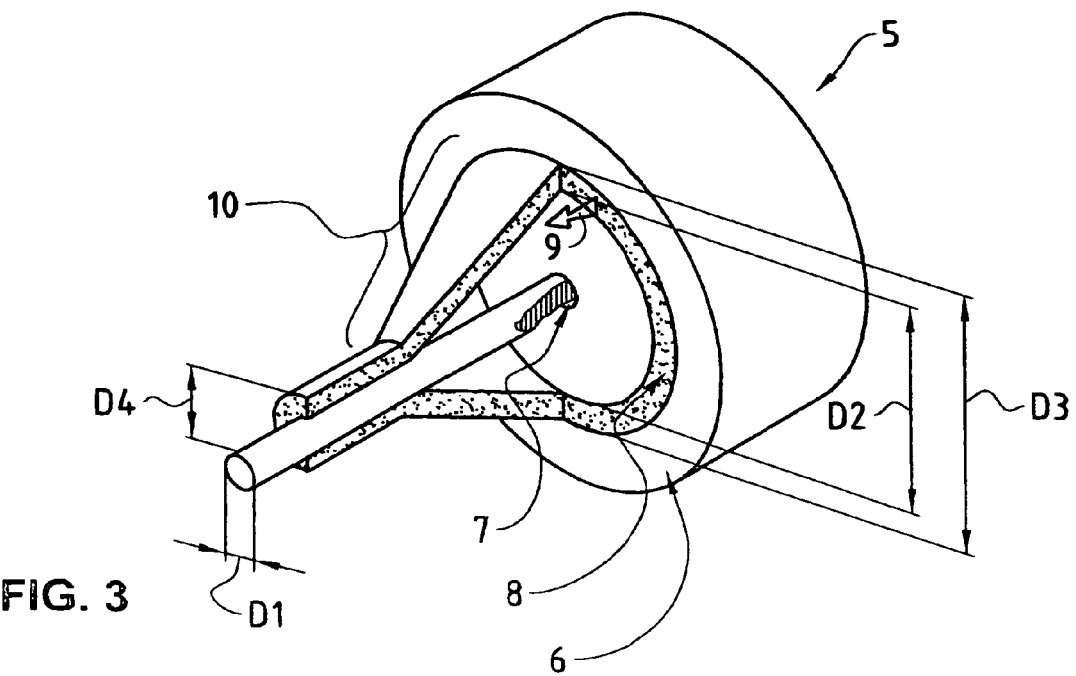
FIG. 3 is a partial view in perspective of the extrusion head of FIG. 2.

Referring to FIGS. 2 and 3, one sees a tubular sheath 1 formed by extrusion of an insulation compound 2 on an electrical cable 3 in an extrusion head 4, a foaming agent 200 being introduced in the insulation compound 2 in such a way as to improve the capacitance value C1 of the tubular insulation sheath 1.

The capacitance value of the tubular sheath 1 depends on the dielectric value of the insulation compound 2. The said dielectric value is modified when the insulation compound is foamed by making use of a foaming agent 200 which is introduced in the insulation compound before extrusion (chemical foaming or physical foaming). For example, the foaming agent 200 is a gas, namely, nitrogen. Preferably, but not exclusively, the extrusion line comprises a high pressure nitrogen injection unit which is connected to the main extruder 18.

An optional auxiliary extruder 17, could also be used in order to put a first skin insulation around the cable 3 with the object to improve the physical foaming adherence (it is not used with chemical foaming, and is optional but recommended with physical foaming).

Another optional auxiliary extruder 18, could also be used in order to put a second skin insulation around the insulation compound (for example a coloured skin).

According to the process of the invention:
a predetermined amount of foaming agent 200 is used in such a way as to obtain a predetermined capacitance value C1 for the tubular insulation sheath 1, and
in order to control precisely the capacitance value C1 of the tubular insulation sheath 1, a gas pressure 110 is applied on at least a portion of a face 100, 101 of the insulation compound 2 extruded by the extrusion head 4,
the value of the gas pressure 110 is changed in such a way as to control the capacitance value C1 of the tubular insulation sheath 1.

In one embodiment, taking into account the atmospheric pressure as a reference, the gas pressure 110 applied on at least a portion of a face 100, 101 of the insulation compound 2, extruded by the extrusion head 4, is negative.

In an embodiment variant, taking into account the atmospheric pressure as a reference, the gas pressure 110 applied on at least a portion of a face 100, 101 of the insulation compound 2, extruded by the extrusion head 4, is positive.

Referring to FIGS. 2 and 3, one sees a tubular sheath 1 formed by extrusion of an insulation compound 2 on an electrical cable 3 in an extrusion head 4 having a nozzle 5 with a front face 6 into which come out:

an orifice 7, referred to as the axial orifice 7, shaped so as to allow passage of the electrical cable 3 to be sheathed, and an annular orifice 8, centered on the axial orifice 7, which annular orifice 8 is itself intended to deliver a flow 9 of insulation compound 2 which material takes the form of a conical wall 10, which covers the electrical cable at a predetermined distance from the front face 6 of the nozzle 5 in such a way as to form a tubular sheath 1 around said cable thus constituting a tubular insulation sheath 1 having a measurable capacitance value C1.

The main extruder 18 which comprises the extrusion head 4, also comprises a device 13 for measuring the capacitance value C1 of the tubular insulation sheath 1 formed around the electrical cable 3.

Noteworthy is that:

in order to apply a negative gas pressure 110 on at least a portion of a face 100, 101 of the insulation compound 2 extruded by the extrusion head 4, a depression is created in a tapering volume 12 contained within the conical wall 10, and the value of the depression created in the tapering volume 12 within the conical wall 10 is changed in such a way as to control the capacitance value C1 of the tubular insulation sheath 1.

Noteworthy is that:

a suction device 11 is connected to the nozzle 5 and operated so as to create a depression in a tapering volume 12 contained within the conical wall 10, and the value of the depression created by the suction device 11 in the tapering volume 12 within the conical wall 10, formed through the annular orifice 8, of insulation compound 2, is changed in such a way as to control the capacitance value C1 of the tubular insulation sheath 1.

One skilled in the art is able to find the most appropriate suction device 11 to obtain the required depression.

These technical features make it possible to control the capacitance value of an electrical sheath provided on an electrical cable without modifying the composition of the compound.

The process is characterised by the steps of:

before the extrusion of an insulation compound 2 on an electrical cable 3, connecting a suction device 11 of adjustable type to the nozzle 5, i.e. a suction device whose operation is controllable so as to yield the desired value for the depression, and during the extrusion of the insulation compound 2 on the electrical cable 3, the following subsequent steps are carried out:

setting a target capacitance value C2 for the tubular insulation sheath 1, setting an upper C2S and a lower C2I value limit permissible for said target value C2, measuring the capacitance C1 of the tubular sheath 1 formed around the cable 3 and comparing it to the target value C2, and if a predetermined deviation from the target value C2 is detected, changing the value of the depression created in the tapering volume 12 within the conical wall 10, formed through the annular orifice 8, of insulation compound 2, in such a way as to correct the value of the capacitance C1 of the tubular sheath 1 formed around the cable 3.

Referring to the drawing, one sees that the tubular sheath 1 is formed by extrusion of an insulation compound 2 on an electrical cable 3 of diameter D1, referred to as the first diameter.

The nozzle 5 has a front face 6 into which come out:

an orifice 7, referred to as the axial orifice 7, shaped so as to allow passage of the electrical cable 3 to be sheathed, and an annular orifice 8, centered on the axial orifice 7, which annular orifice 8, defined by an inner diameter D2, referred to as the second diameter, greater than said first diameter D1 of the electrical cable 3, and an outer diameter D3, referred to as the third diameter, greater than said second diameter D2, is itself intended to deliver a flow 9 of insulation compound 2.

This insulation compound 2 takes the form of a conical wall 10, which covers the electrical cable at a predetermined distance from the front face 6 of the nozzle 5 in such a way as to form a tubular sheath 1 around said cable of a fourth diameter D4, thus constituting a tubular insulation sheath 1 having a measurable capacitance value C1.

According to the process of the invention, the fourth diameter D4 is adjusted to a predetermined value by controlling the speed of the electric cable 3 and the tubular sheath 1 formed by extrusion of an insulation compound on the electric cable 3.

Referring to the drawings, one sees that, the insulation compound 2 emerges out of the annular orifice 8 at a predetermined linear speed which depends on the rotational speed of an extrusion screw which is used in the extrusion head 4.

For example, the fourth diameter D4 is adjusted to a predetermined value by controlling the rotational speed of an extrusion screw in the extruder 18 comprising the extrusion head 4 out of which the insulation compound 2 emerges.

Capacitance and diameter are linked together, but a modification of the vacuum will have an effect on the diameter but this effect is very limited and almost insignificant for the process.

The invention claimed is:

1. A process for controlling the capacitance value of a tubular sheath formed by extrusion of an insulation compound on an electrical cable in an extrusion head, the process comprising introducing a foaming agent in the insulation compound to improve the capacitance value of the tubular insulation sheath, wherein:

a predetermined amount of the foaming agent is used to obtain a predetermined capacitance value for the tubular insulation sheath, and a gas pressure is applied on at least a portion of an inner face of the insulation compound extruded by the extrusion head to control the capacitance value of the tubular insulation sheath, and the value of the gas pressure is adjusted to control the capacitance value of the tubular insulation sheath.

2. The process according to claim 1, wherein, taking into account an atmospheric pressure as a reference, the value of the gas pressure applied is negative.

3. The process according to claim 1, wherein, taking into account an atmospheric pressure as a reference, the value of the gas pressure applied is positive.

4. The process according to claim 1, wherein the extrusion head has
   a nozzle having a front face,
   an axial orifice shaped to allow passage of the electrical cable to be sheathed therethrough, and
   an annular orifice centered on the axial orifice, wherein the annular orifice
      delivers a flow of the insulation compound, which takes the form of a conical wall, to cover the electrical cable at a predetermined distance from the front face of the nozzle to form the tubular sheath around the cable to constitute a tubular insulation sheath having a measurable capacitance value, and
      applies a negative gas pressure on at least a portion of an inner face of the insulation compound extruded by the extrusion head to create a depression in a tapering volume contained within the conical wall, the size of the depression created in the tapering volume within the conical wall being adjusted to control the capacitance value of the tubular insulation sheath.

5. The process according to claim 4, wherein:
   a suction device is connected to the nozzle and operated to create a depression in the tapering volume contained within the conical wall.

6. The process according to claim 5, wherein
   before the extrusion of the insulation compound on an electrical cable, the suction device of adjustable type is connected to the nozzle, and
   during the extrusion of the insulation compound on the electrical cable, the capacitance of the tubular sheath formed around the cable is measured and compared to permissible range of target capacitance values for the tubular insulation sheath, the range being defined by a lower capacitance value limit and an upper capacitance value limit, and
   if a predetermined deviation from the range of permissible target values is detected, the value of the depression created in the tapering volume is changed to correct the value of the capacitance of the tubular sheath formed around the cable.

7. The process according to claim 1, wherein the diameter of the tubular insulation sheath is adjusted to a predetermined value by controlling the speed of the electrical cable and the tubular sheath formed by extrusion of an insulation compound on the electrical cable.

* * * * *